US008041390B2

(12) United States Patent
Jeong et al.

(10) Patent No.: US 8,041,390 B2
(45) Date of Patent: Oct. 18, 2011

(54) MOBILE TERMINAL AND DATA UPLOADING METHOD THEREOF

(75) Inventors: Kye Sook Jeong, Seoul (KR); Hye Eun Shin, Seoul (KR)

(73) Assignee: LG Electronics Inc, Seoul (KR)

( * ) Notice: Subject to any disclaimer, the term of this patent is extended or adjusted under 35 U.S.C. 154(b) by 743 days.

(21) Appl. No.: 12/057,048

(22) Filed: Mar. 27, 2008

(65) Prior Publication Data

US 2009/0104934 A1 Apr. 23, 2009

(30) Foreign Application Priority Data

Oct. 19, 2007 (KR) .................. 10-2007-0105467

(51) Int. Cl.
*H04M 1/00* (2006.01)
(52) U.S. Cl. ................................. 455/556.1; 455/550.1
(58) Field of Classification Search ............... 455/556.1, 455/550.1; 709/217–219
See application file for complete search history.

(56) References Cited

U.S. PATENT DOCUMENTS 6,381,029 B1 * 4/2002 Tipirneni ..................... 358/1.14
2002/0087601 A1 7/2002 Anderson et al.
2003/0119685 A1 6/2003 Chappell et al.
2003/0179406 A1 9/2003 Seto
2004/0116148 A1 * 6/2004 Ku ............................ 455/550.1
2005/0102635 A1 5/2005 Jiang et al.
2006/0041632 A1 * 2/2006 Shah et al. .................... 709/217
2006/0143280 A1 * 6/2006 Ohba ........................... 709/206
2007/0159651 A1 * 7/2007 Disario et al. ............... 358/1.15

FOREIGN PATENT DOCUMENTS

EP 1480442 A2 11/2004
EP 1819139 A1 8/2007

* cited by examiner

*Primary Examiner* — Raymond Dean
(74) *Attorney, Agent, or Firm* — Birch, Stewart, Kolasch & Birch, LLP (57) ABSTRACT

A mobile communication terminal, a computer program product and a data uploading method by which data stored in a mobile terminal can be shared in a manner of uploading the data to websites. The mobile communication terminal includes a camera for capturing an image, a memory for storing data, a display for displaying the stored data, an input unit for selecting one of the stored data to upload to a website, the input unit for inputting an upload information on the selected data, a wireless communication unit for transmitting the selected data to upload to the website, and a control unit, if the selected data is completely uploaded, the control unit causing access to the website to be automatically released.

27 Claims, 10 Drawing Sheets

MOBILE TERMINAL AND DATA UPLOADING METHOD THEREOF

CROSS REFERENCE TO RELATED APPLICATIONS

This application claims the benefit of the Korean Patent Application No. 10-2007-0105467, filed on Oct. 19, 2007, which is hereby incorporated by reference as if fully set forth herein.

BACKGROUND OF THE INVENTION

1. Field of the Invention

The present invention relates to a mobile communication terminal, computer program product and data uploading method thereof. Although the present invention is suitable for a wide scope of applications, it is particularly suitable for uploading data stored in the mobile terminal to websites.

2. Discussion of the Related Art

A mobile terminal is a device that may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

Recently, many efforts have been made to research and develop technologies for sharing data stored in a mobile terminal. For instance, efforts are ongoing to research and develop the technology for sharing data stored in a mobile terminal in a manner of uploading the data to websites.

SUMMARY OF THE INVENTION

Accordingly, the present invention is directed to a mobile communication terminal, computer program product and data uploading method thereof that substantially obviate one or more problems due to limitations and disadvantages of the related art.

An object of the present invention is to provide a mobile communication terminal, computer program product and data uploading method thereof, by which data stored in a mobile terminal can be shared in a manner of uploading the data to websites.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a camera for capturing an image, a memory for storing data, a display unit displaying the stored data, an input unit for selecting one of the stored data to upload to a website, the input unit for inputting an upload information on the selected data, a wireless communication unit transmitting the selected data to upload to the website, and a control unit, if the selected data is completely uploaded, the control unit controlling an access to the website to be automatically released.

In another aspect of the present invention, a mobile terminal according to the present invention includes a camera for capturing an image, a memory for storing data, a display unit displaying the stored data, an input unit for selecting one of the stored data to upload to a website, the input unit for inputting an upload information on the selected data, a wireless communication unit transmitting the selected data to upload to the website, and a control unit, if the selected data is completely uploaded, the control unit controlling a message containing a URL information on a specific webpage of the website to be sent to a specific correspondent party to confirm the uploaded data.

In another aspect of the present invention, a computer program product and a method of uploading data in a mobile terminal according to the present invention includes the steps of receiving a key signal for selecting data to upload to a website, receiving a key signal for inputting an upload information on the selected data, uploading the selected data and an upload information of the selected data to the website, and if the selected data is completely uploaded, releasing an access to the website automatically.

In another aspect of the present invention, a computer program product and a method of uploading data in a mobile terminal according to the present invention includes the steps of receiving a key signal for selecting data to upload to a website, receiving a key signal for inputting an upload information on the selected data, uploading the selected data and an upload information of the selected data to the website, and if the selected data is completely uploaded, sending a message containing a URL information on a specific webpage of the website to a specific correspondent party to confirm the uploaded data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. It is to be understood by those of ordinary skill in this technological field that other embodiments may be utilized, and structural, electrical, as well as procedural changes may be made without departing from the scope of the present invention.

Figure 1:
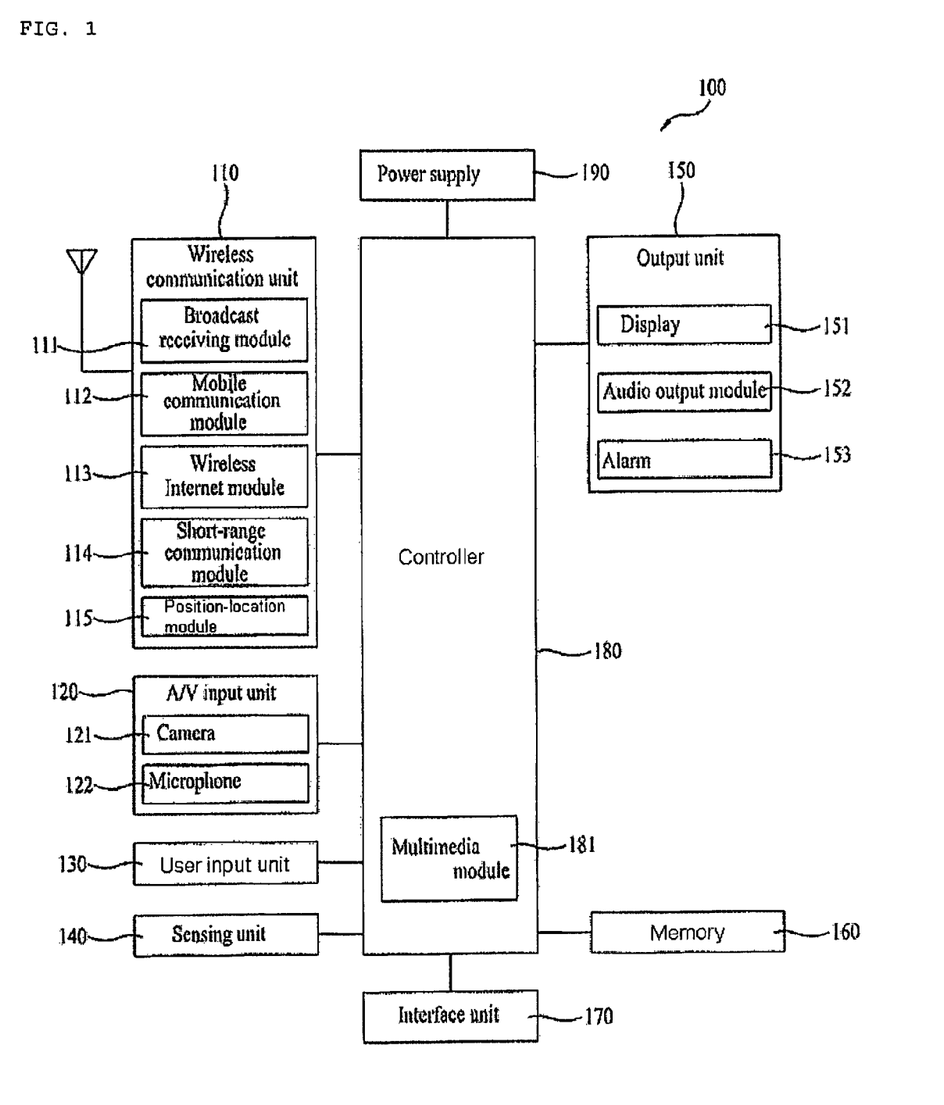
FIG. 1 is a block diagram of a mobile terminal in accordance with an embodiment of the present invention.

FIG. 1 is a block diagram of mobile terminal 100 in accordance with an embodiment of the present invention. The mobile terminal may be implemented using a variety of different-types of terminals. Examples of such terminals include mobile phones, user equipment, smart phones, computers, digital broadcast terminals, personal digital assistants, portable multimedia players (PMP) and navigators. By way of non-limiting example only, further description will be with regard to a mobile terminal. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For instance, the wireless communication unit 110 typically includes one or more components which permits wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile terminal. This module may be internally or externally coupled to the terminal.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile terminal. If desired, this module may be implemented using global positioning system (GPS) components which cooperate with associated satellites, network components, and combinations thereof.

Audio/video (A/V) input unit 120 is configured to provide audio or video signal input to the mobile terminal. As shown, the A/V input unit 120 includes a camera 121 and a microphone 122. The camera receives and processes image frames of still pictures or video. The video data may include audio data.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

The sensing unit 140 provides status measurements of various aspects of the mobile terminal. For instance, the sensing unit may detect an open/close status of the mobile terminal, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the mobile terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile terminal. Display 151 is typically implemented to visually display information associated with the mobile terminal 100. For instance, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

FIG. 1 further shows output unit 150 having an audio output module 152 that supports the audio output requirements of the mobile terminal 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile terminal. Typical events include call received, message received and user input received. An example of such output includes the providing of tactile sensations (e.g., vibration) to a user. For instance, the alarm 153 may be configured to vibrate responsive to the mobile terminal receiving a call or message. As another example, vibration is provided by alarm 153 responsive to receiving user input at the mobile terminal, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile terminal. Examples of such data include program instructions for applications operating on the mobile terminal, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile terminal. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

Mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal. However such teachings apply equally to other types of terminals.

Figure 2:
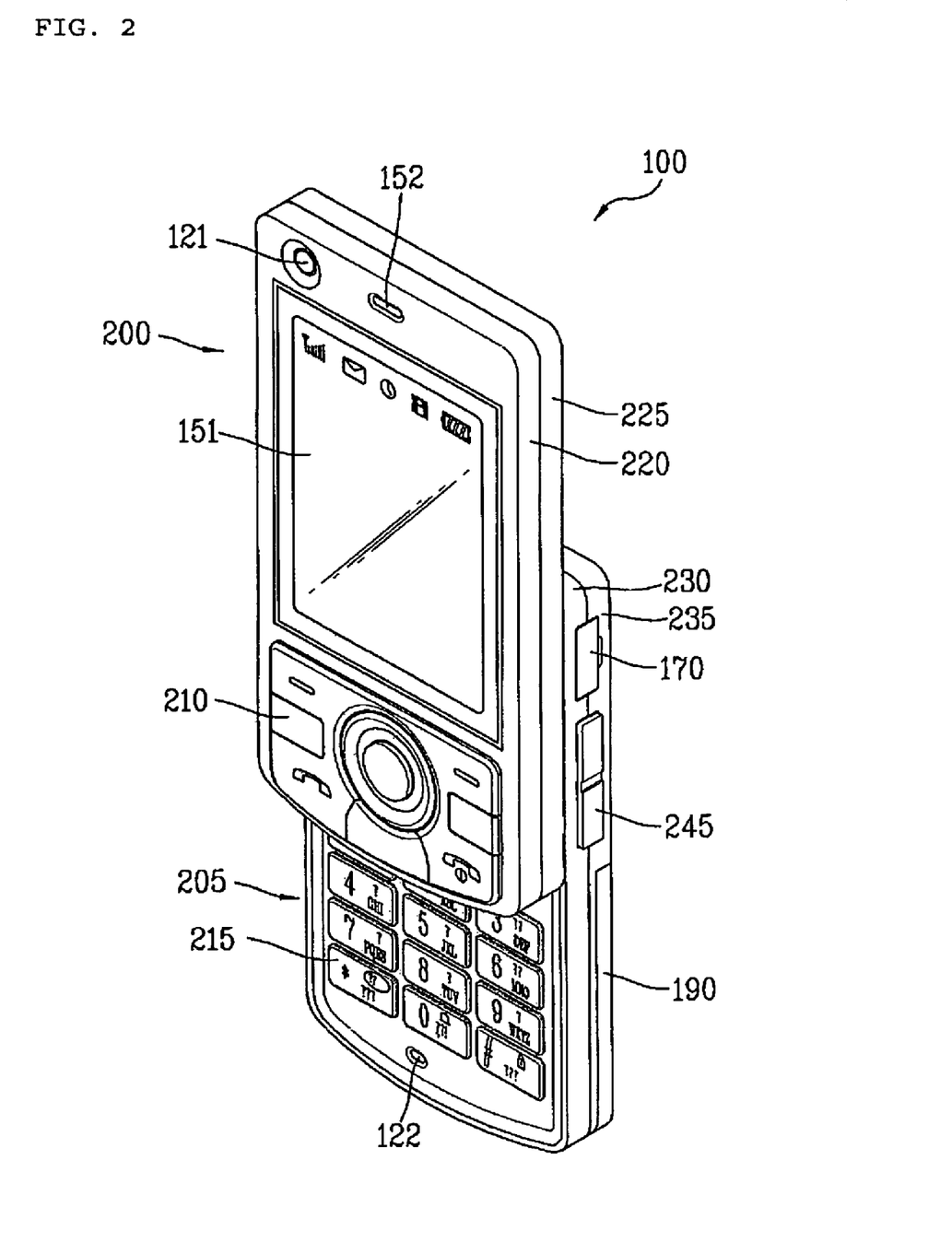
FIG. 2 is a perspective view of a front side of a mobile terminal according to an embodiment of the present invention.

FIG. 2 is a perspective view of a front side of a mobile terminal according to an embodiment of the present invention. In FIG. 2, the mobile terminal 100 is shown having a first body 200 configured to slideably cooperate with a second body 205. The user input unit (described in FIG. 1) is implemented using function keys 210 and keypad 215. The function keys 210 are associated with first body 200, and the keypad 215 is associated with second body 205. The keypad includes various keys (e.g., numbers, characters, and symbols) to enable a user to place a call, prepare a text or multimedia message, and otherwise operate the mobile terminal.

The first body 200 slides relative to second body 205 between open and closed positions. In a closed position, the first body is positioned over the second body in such a manner that the keypad 215 is substantially or completely obscured by the first body 200. In the open position, user access to the keypad 215, as well as the display 151 and function keys 210, is possible. The function keys are convenient to a user for entering commands such as start, stop and scroll.

The mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. This mode configuration may be changed as required or desired.

The first body 200 is shown formed from a first case 220 and a second case 225, and the second body 205 is shown formed from a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200, 205. The first and second bodies 200, 205 are typically sized to receive electronic components necessary to support operation of the mobile terminal 100.

The first body 200 is shown having a camera 121 and audio output unit 152, which is configured as a speaker, positioned relative to the display 151. If desired, the camera 121 may be constructed in such a manner that it can be selectively positioned (e.g., rotated, swiveled, etc.) relative to first body 200.

The function keys 210 are positioned adjacent to a lower side of the display 151. The display 151 is shown implemented as a liquid crystal display (LCD) or organic light emitting display (OLED). Recall that the display may also be configured as a touchscreen having an underlying touchpad which generates signals responsive to user contact (e.g., finger, stylus, etc.) with the touchscreen.

Second body 205 is shown having a microphone 122 positioned adjacent to keypad 215, and side keys 245, which are one type of a user input unit, positioned along the side of second body 205. Preferably, the side keys 245 may be configured as hot keys, such that the side keys are associated with a particular function of the mobile terminal. An interface unit 170 is shown positioned adjacent to the side keys 245, and a power supply 190 in a form of a battery is located on a lower portion of the second body 205.

Figure 3:
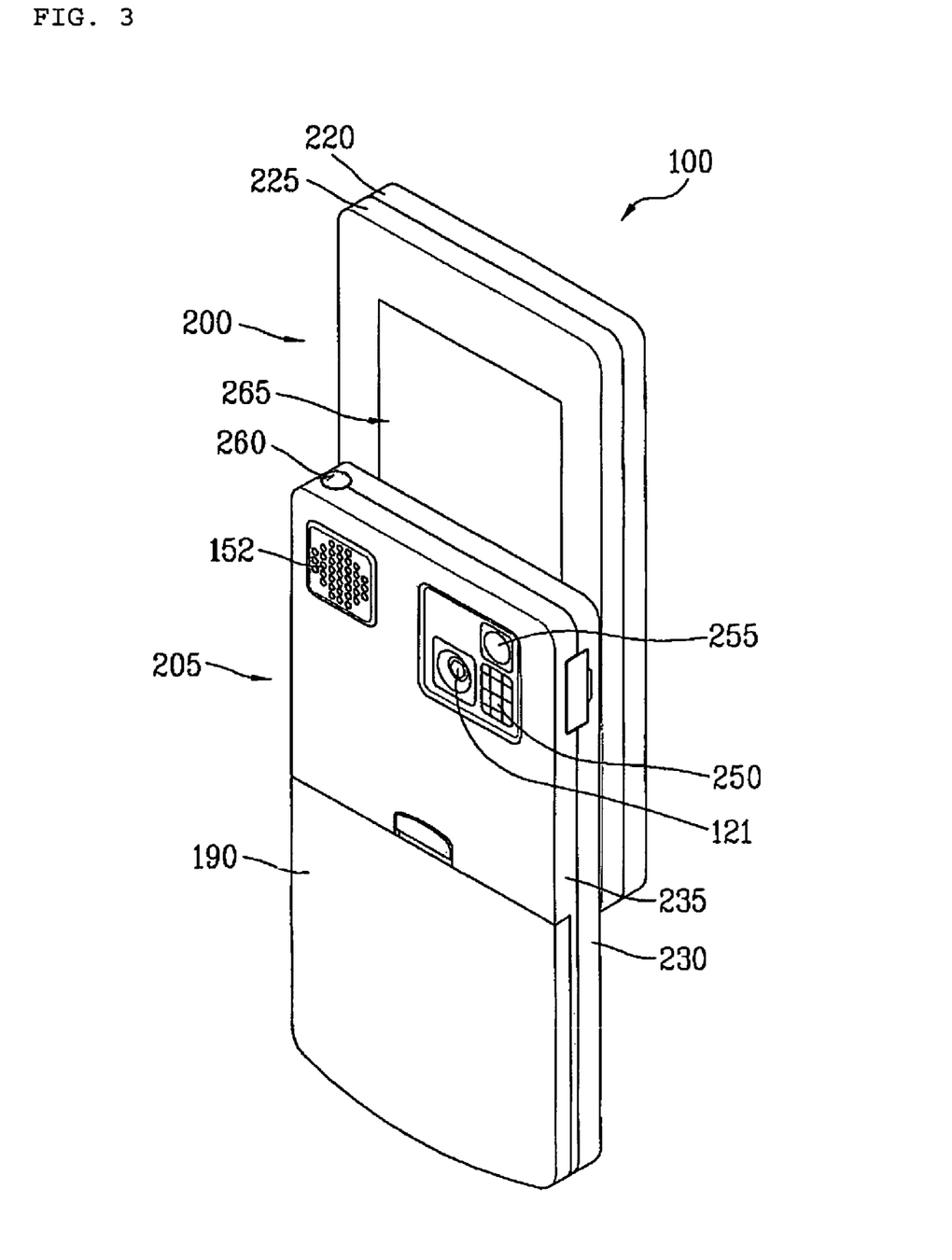
FIG. 3 is a rear view of the mobile terminal shown in FIG. 2.

FIG. 3 is a rear view of the mobile terminal shown in FIG. 2. FIG. 3 shows the second body 205 having a camera 121, and an associated flash 250 and mirror 255. The flash operates in conjunction with the camera 121 of the second body. The mirror 255 is useful for assisting a user to position camera 121 in a self-portrait mode. The camera 121 of the second body faces a direction which is opposite to a direction faced by camera 121 of the first body 200 (FIG. 2). Each of the cameras 121 of the first and second bodies may have the same or different capabilities.

In an embodiment, the camera of the first body 200 operates with a relatively lower resolution than the camera of the second body 205. Such an arrangement works well during a video conference, for example, in which reverse link bandwidth capabilities may be limited. The relatively higher resolution of the camera of the second body 205 (FIG. 3) is useful for obtaining higher quality pictures for later use or for communicating to others.

The second body 205 also includes an audio output module 152 configured as a speaker, and which is located on an upper side of the second body. If desired, the audio output modules of the first and second bodies 200, 205, may cooperate to provide stereo output. Moreover, either or both of these audio output modules may be configured to operate as a speakerphone.

A broadcast signal receiving antenna 260 is shown located at an upper end of the second body 205. Antenna 260 functions in cooperation with the broadcast receiving module 111 (FIG. 1). If desired, the antenna 260 may be fixed or configured to retract into the second body 205. The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

The mobile terminal 100 of FIGS. 1-3 may be configured to operate within a communication system that transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
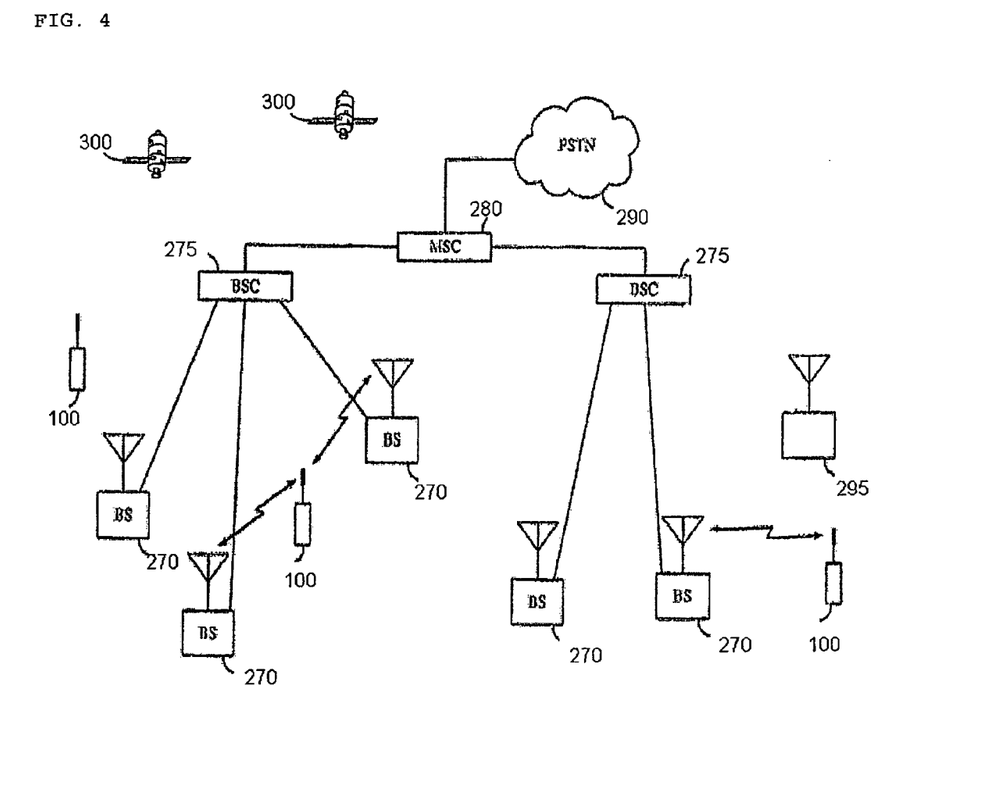
FIG. 4 is a block diagram of a CDMA wireless communication system operable with the mobile terminal of FIGS. 1 to 3.

Referring now to FIG. 4, a CDMA wireless communication system is shown having a plurality of mobile terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable terminals 100 operating within the system. The broadcast receiving module 111 (FIG. 1) of the portable terminal is typically configured to receive broadcast signals transmitted by the DMB transmitter 295. Similar arrangements may be implemented for other types of broadcast and multicast signaling (as discussed above).

FIG. 4 further depicts several global positioning system (GPS) satellites 300. Such satellites facilitate locating the position of some or all of the portable terminals 100. Two satellites are depicted, but it is understood that useful positioning information may be obtained with greater or fewer satellites. The position-location module 115 (FIG. 1) of the portable terminal 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile terminals 100.

A data uploading method in a mobile terminal according to one embodiment of the present invention is explained as follows.

Figure 5:
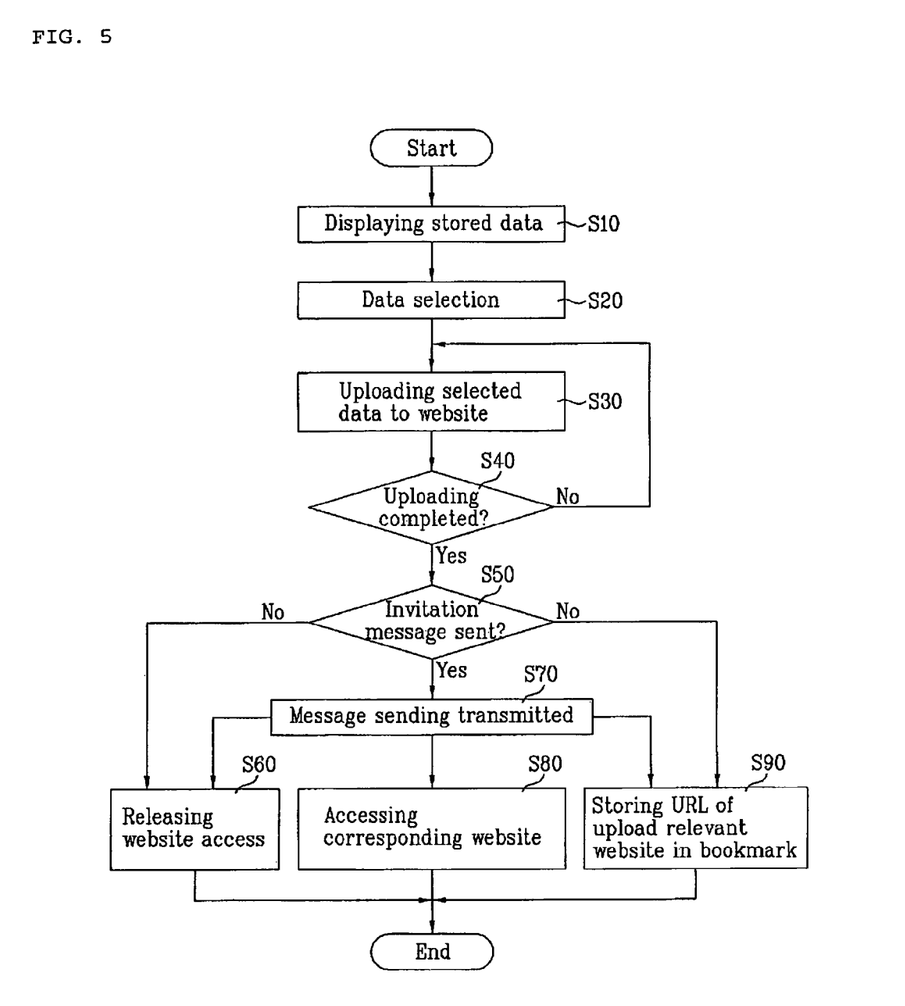
FIG. 5 is a flowchart for a method of uploading data in a mobile terminal according to one embodiment of the present invention.

FIG. 5 is a flowchart for a method of uploading data in a mobile terminal according to one embodiment of the present invention.

Referring to FIG. 5, for uploading data, a control unit 180 receives a specific key signal (e.g., key signal for data confirmation) and then displays data stored in a memory 160 [S10]. For instance, the data stored in the memory 160 can include a moving picture file, an image file, a music file, etc.

In particular, a moving picture or image is captured using a camera 121. The captured moving picture or image can be then stored in the memory 160.

The data can be displayed in various ways. For instance, data can be displayed as a thumbnail image. This example is shown in FIG. 6.

Figure 6:
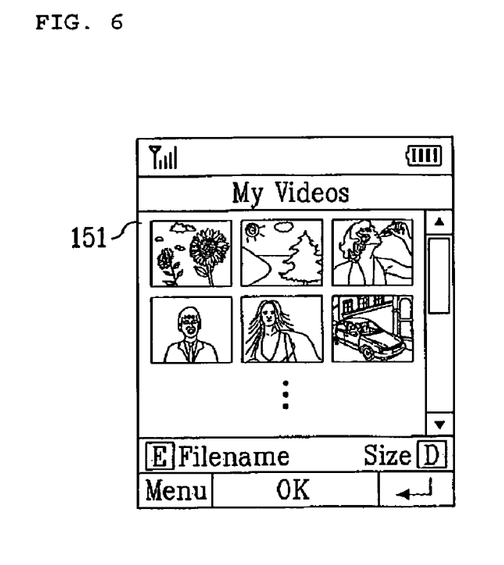
FIGS. 6 to 14 are diagrams for explaining procedures for data uploading in a mobile terminal according to one embodiment of the present invention.

Referring to FIG. 6, a moving picture file is displayed as a thumbnail image. If data is displayed as a thumbnail image, a user is able to perceive contents of the data visually and intuitively.

The control unit 180 enables the stored data to be deleted or edited. Of course, new data is generated and stored in addition.

A user is able to select a specific one of the displayed data to upload the selected data to a specific website [S20]. In particular, the specific data can be selected by an input made by the user.

A display unit 151, as shown in FIG. 6, can include a touchscreen. If the display unit 151 is configured as the touchscreen, data can be selected via a touch input.

When specific data is selected, mobile terminal 100 is able to carry out various functions associated with the selected specific data.

For instance, if 'E' is touched while specific data is selected via a touch input, the control unit 180 enables a screen to be switched to a picture for editing the selected data. Editing may include red-eye adjustment, cropping, labeling, adding special effects and the like.

While the specific data is selected via the touch input, if 'D' is touched, the control unit 180 is able to delete the selected data. While the specific data is selected via the touch input, if 'OK' is touched, the control unit 180 is able to switch the screen to a picture for checking details of the selected data or a picture for playing back the selected data.

Moreover, the control unit 180 is able to display a picture for uploading the selected data to a prescribed website. The picture for uploading the data is shown in FIG. 7.

Figure 7:
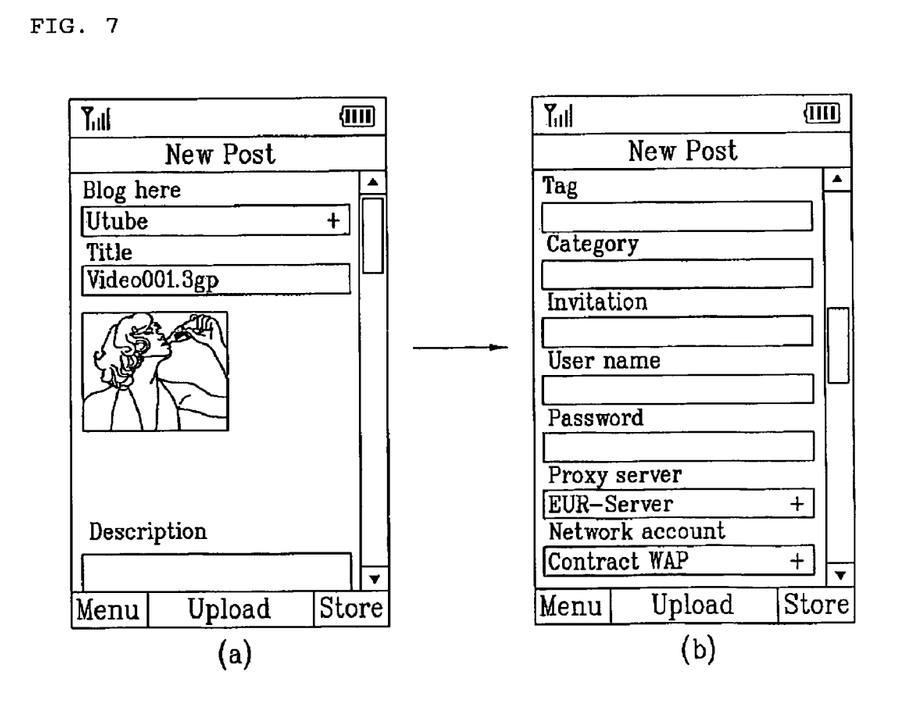

Referring to FIG. 7, an item for inputting upload information is provided to the screen. In this case, the upload information means the information for recording the uploaded data to be identified or confirmed.

The upload information can include URL information on a website to which the selected data will be uploaded, tag information on the uploaded data, a category to which the uploaded data belongs, a title of the uploaded data, a user name, a ranking count, a description for the uploaded data, a password, an access level of the uploaded data, etc.

The URL information on the website is the information for accessing the corresponding website. URL is to designate locations of files in each server for providing a service on web and includes a type of service to access, a location of server (domain name), and a location of file.

The tag information on the uploaded data can include an index or a keyword relevant to the uploaded data.

The ranking count indicates a ranking of the uploaded data based on a specific reference. For instance, the ranking count can be determined based on the number of visitors to the uploaded data or an evaluation point of the data by users sharing the uploaded data.

The 'category to which the uploaded data belongs' indicates a category into which the uploaded data is categorized on a website.

The 'access level of the uploaded data to the public' indicates whether data to be uploaded can be shared by everyone (e.g., set to 'public') or by specific people only (e.g., set to 'private').

In case of uploading data, a schematic description for the data to be uploaded can be inputted. And, this description can become the upload information.

The user name indicates an ID for the website access. And, the password indicates a secret number for the website access.

In case that data to be uploaded includes a moving picture file, the control unit 180 can generate a playback and size of the moving picture file as the upload information.

Meanwhile, items for the upload information input include tag, category, invitation, privacy, and the like. Te upload information relevant to the item can be inputted by a manipulation of a user input unit 130.

In particular, in case that the user input unit 130 includes a touchscreen configuring a mutual layer structure with the display unit 151, a content of the item can be inputted via a touch input.

For instance, a website to which selected data will be uploaded is inputted to 'Blog here'. A title of data to be uploaded is inputted to 'Title'. A keyword relevant to data to be uploaded is inputted to 'Tag'. And, it is able to ser whether to send an invitation message to a specific correspondent user via 'Invitation' box. Via 'Privacy' box, it is able to set whether data to be uploaded shall be shared by everyone or by specific people only. And, a description for data to be uploaded can be inputted to 'Description' box.

In case that data to be uploaded includes a moving picture file, the thumbnail shown in FIG. 7 can represent an image relevant to a representative frame of the moving picture file. The control unit 180 extracts a plurality of images corresponding to prescribed frame intervals, respectively and then displays the extracted image in a slide format.

Once the upload information inputs to the corresponding items are completed, the user is able to upload the selected data to a specific website [S30].

In particular, the user is able to upload the selected data to the specific website using 'Upload' menu displayed on a lower end of the screen.

Once a signal for an upload command is inputted, the control unit 180 accesses the specific website and then sends the selected data and the corresponding upload information to the accessed website. While the data is being uploaded, the mobile terminal 100 keeps accessing the specific website.

After completion of the data uploading, the control unit 180 is able to release the access to the website automatically [S40, S50, S60]. By releasing the access to the website automatically as soon as the uploading completion, users are able to reduce/avoid toll charges for the internet access. And, it is understood that the access to the website can be maintained despite the completion of the data uploading.

According to one embodiment of the present invention, in case that the website access is released due to the completion of the uploading, the access release can be announced to the user. This example is shown in FIG. 8.

Figure 8:
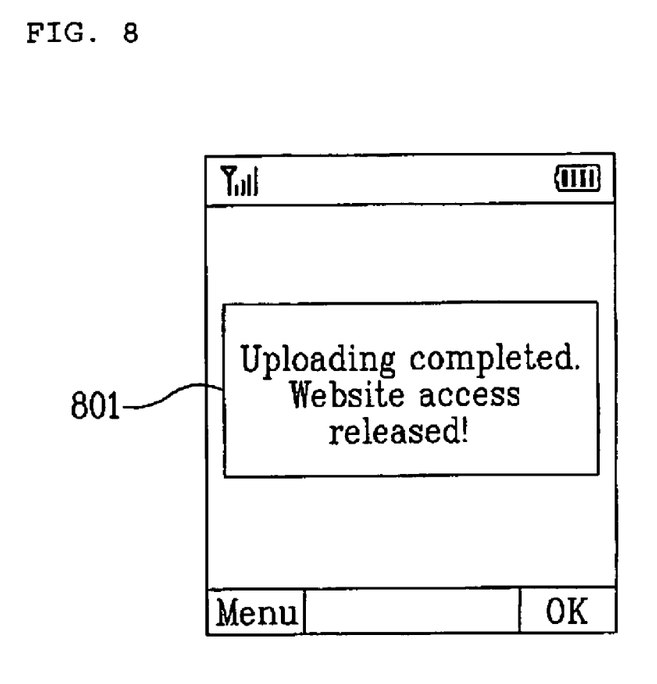

Referring to FIG. 8, the user is able to recognize the uploading completion and the website access release in a manner that a pop-up window 801 is displayed on the screen.

According to one embodiment of the present invention, in case that data is uploaded to a specific website, data sharing can be carried out quickly and conveniently in a manner of notifying the data uploading to a specific correspondent user.

For instance, an invitation message can be sent to enable a specific correspondent user to confirm the uploaded data [S50, S70]. In this case, the invitation message contains URL information on a specific webpage of the website for the confirmation of the uploaded data.

In this disclosure, a website, to which data is uploaded, means a specific web space for uploading data and a specific webpage of the website means a space on a web to directly confirm the uploaded data on the corresponding page. 'http:// Utube.com' is an example for URL of the website and 'http:// Utube.com/categories . . . ' can be an example for URL of the webpage. It is understood that the URL of the website may or may not be identical to the RUL of the webpage or may.

Meanwhile, if the data uploading is completed, the control unit 180 is able to automatically generate the invitation message based on the previously inputted upload information. In this case, the generated invitation message can be modified by a manipulation of the user input unit 130. And, the invitation message can be inputted by a manipulation of the user input unit 130. The invitation message input can be carried out in the course of inputting the upload information of after completion of the uploading.

According to one embodiment of the present invention, a transmission of the invitation message can be carried out as soon as the data uploading is executed. This example is shown in FIG. 9.

Figure 9:
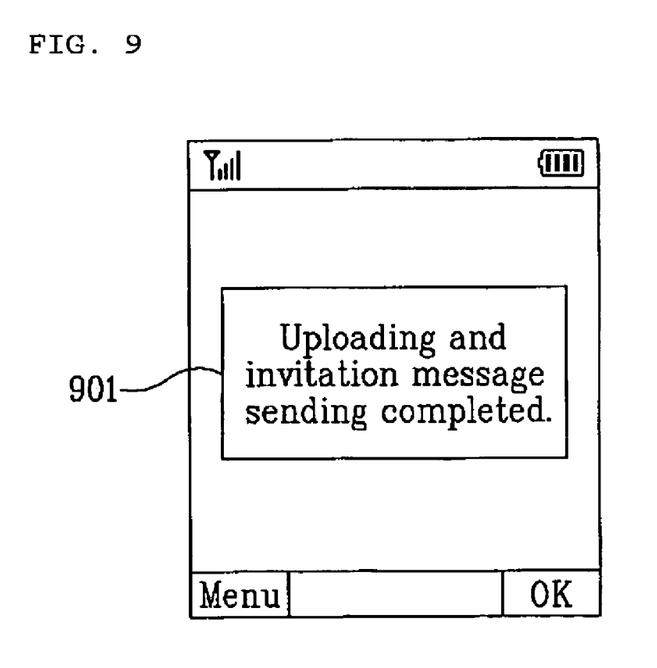

FIG. 9 shows an exemplary case that, in case that both data uploading and invitation message transmission are simultaneously carried out, they are notified to a user.

Referring to FIG. 9, in case that both data uploading and invitation message transmission are completed, the control unit 180 is able to display a pop-up window 901 representing an upload completion and a message transmission completion.

Meanwhile, the invitation message transmission can be set in case of an information input. In this case, the control unit 180 is able to transmit an invitation message after completion of the data uploading. And, the control unit 180 is able to display a notification statement about an invitation message transmission before transmitting an invitation message.

According to one embodiment of the present invention, even if a setup for the invitation message transmission is not carried out in case of an upload information input, the invitation message transmission can be carried out via a menu entry after completion of data uploading.

The above-explained invitation message can be transmitted to a specifically selected correspondent party. The specific correspondent party selection can be carried out in case of an invitation message input.

The specific correspondent party can be selected using phonebook information or an online contact address.

The phonebook information means a contact address stored within the mobile terminal 100. And, the online contact address means a contact address for a specific person registered to the website to which the data has been uploaded.

In case that the mobile terminal 100 is connected to the website, it is able to select a specific correspondent party using the online contact address.

Figure 10:
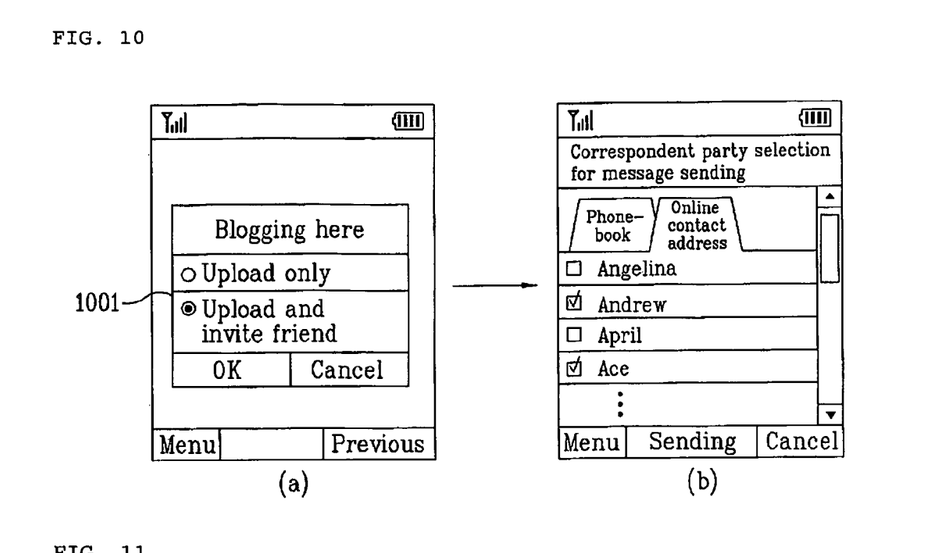

FIG. 10 is a diagram for an example where an invitation message is transmitted to a specific correspondent party to enable data, which is uploaded from a mobile terminal according to the present invention, to be confirmed.

Referring to (a) of FIG. 10, when data is uploaded or if an uploading of data is completed, the control unit 180 is able to display a pop-up window 1001 enabling an invitation message to be transmitted to a specific correspondent party. In this case, the invitation message contains URL information on a webpage for confirming the uploaded data.

If an invitation message transmission is selected from a screen shown in the drawing, a picture for selecting a correspondent party to whom the invitation message will be transmitted, as shown in (b) of FIG. 10, is displayed on the screen.

A user selects a correspondent party, to whom the invitation message will be transmitted, from the picture shown in the drawing and then sends the invitation message to the selected correspondent party. In particular, the control unit 180 sends the invitation message to the selected correspondent party.

The invitation message can be sent using one of e-mail, MMS (multimedia message service), SMS (short message service), IM (instant message), and the like. In particular, the control unit 180 is able to send the invitation message to the selected correspondent party using one of e-mail, MMS (multimedia message service), SMS (short message service), IM (instant message), and the like. In this case, the invitation message contains an address of a website enabling the uploaded data to be confirmed.

Meanwhile, according to one embodiment of the present invention, the mobile terminal 100 receives the invitation message and then confirms the received message. This example is shown in FIG. 11.

Figure 11:
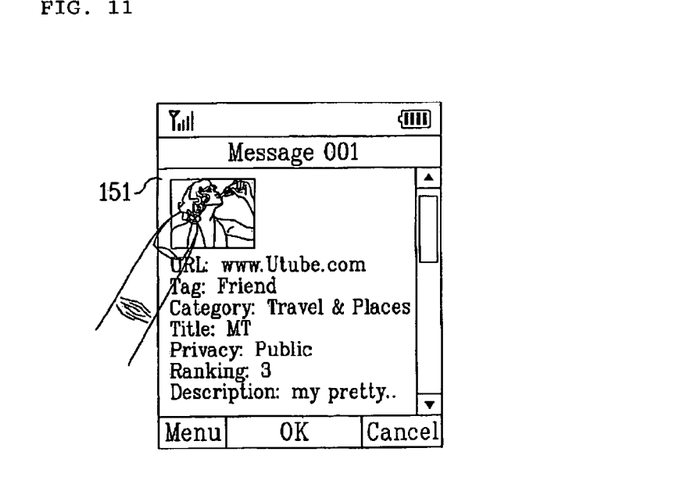

Referring to FIG. 11, the received message represents upload information containing URL information on a webpage to which data has been uploaded.

In this case, a user is able to access a corresponding website by selecting either data represented as a thumbnail image or URL. The thumbnail image may be a single image or a moving image. The user is then able to confirm the uploaded data via the access. In particular, if a display unit 151 includes a touchscreen, the user is able to access the corresponding webpage via a touch input.

The above-explained invitation message transmission can be aggressively utilized for a case that data of moving picture relevant to specific acquaintances or the like has been uploaded.

For instance, in case that a user uploads a moving picture of specific acquaintances, which was captured at membership training, to a specific website, the user sends invitation messages to the specific acquaintances. Hence, the user can share the uploaded moving picture with the specific acquaintances quickly and conveniently.

Meanwhile, according to one embodiment of the present invention, if the data uploading is completed, the control unit 180 is able to display a picture for accessing a webpage to confirm the uploaded data [S80]. The webpage may be accessed by touching the picture, touching another part of the screen, pressing the OK button or by another means. The step S80 can be executed as soon as the completion of the data uploading or the invitation message transmission.

According to one embodiment of the present invention, the control unit 180 is able to store URL information on a data-uploading relevant website [S90]. In this case, the data-uploading relevant website can include a webpage to which data is uploaded and a webpage at which the uploaded data can be confirmed. The two webpages may or may not coincide with each other. So, the expression of 'data-uploading relevant website' is used.

In this case, the control unit 180 enables the URL information on the data-uploading relevant website to be stored in a bookmark.

Both of the steps S80 and S90 can be executed (not shown in the drawing) or either the step S80 or the step S90 can be selectively executed. It is understood that both of the steps S80 and S90 can be omitted.

Figure 12:
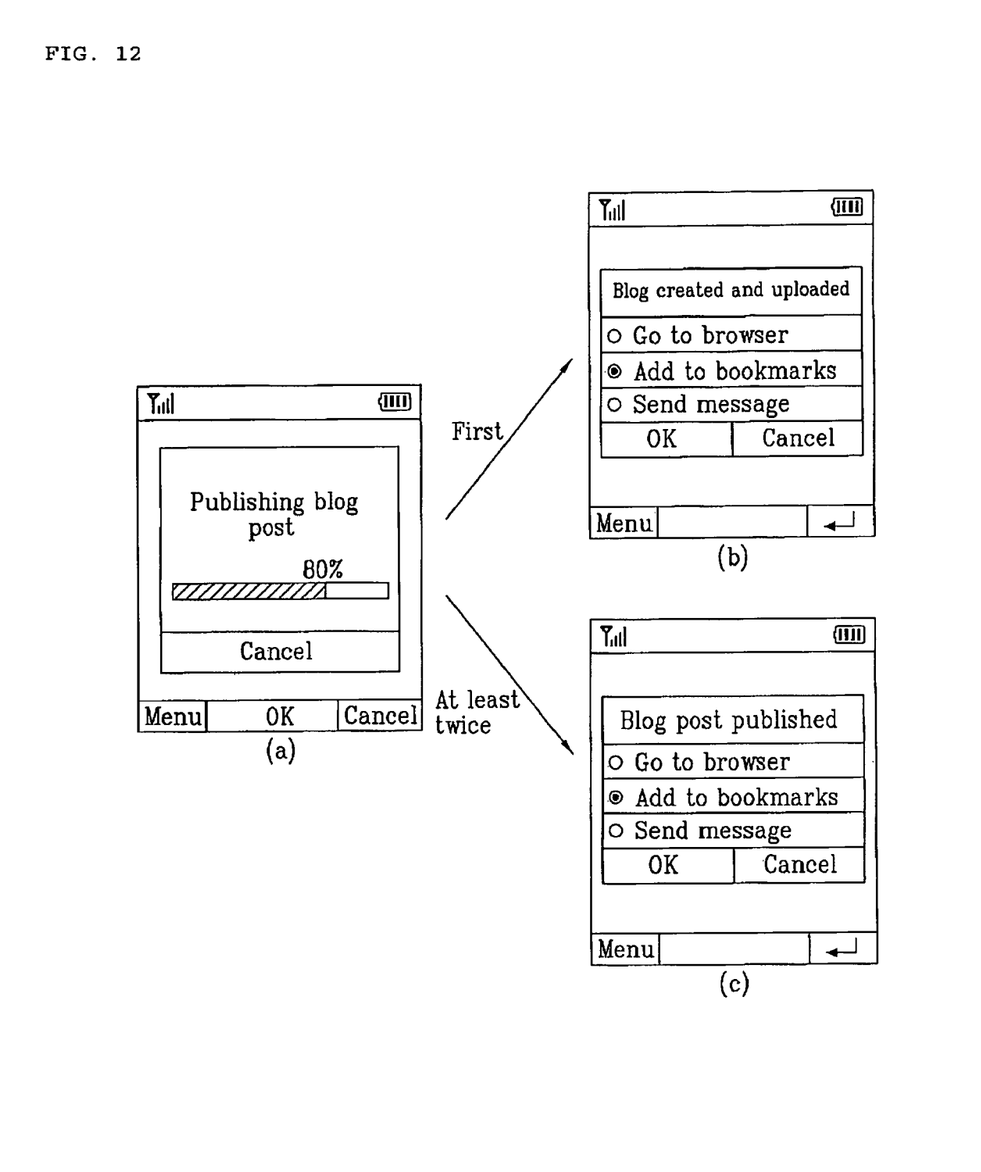

FIG. 12 shows an additionally executed procedure in case that a mobile terminal according to one embodiment of the present invention has completed a data uploading.

Referring to FIG. 12, while a data uploading is in progress, a picture, as shown in (a) of FIG. 12, is displayed.

If the data uploading is completed, a picture, as shown in (b) or (c) of FIG. 12, can be displayed. A case of uploading data to a specific website for the first time is shown in (b) of FIG. 12. A case of uploading data to a specific website at least twice is shown in (c) of FIG. 12.

In (b) or (c) of FIG. 12, a picture for selecting at least one of 'Go to browser', 'Add to bookmarks', and 'Send message' displayed on a screen is shown. Of course, the following is possible. Namely, one of the displayed items is selected, a corresponding function is carried out, and the rest of the displayed items are then selected in sequence.

In particular, the item 'Go to browser' is a menu for confirming uploaded data by accessing a specific communication network (e.g., WAP (wireless application protocol)), the item 'Add to bookmarks' is a menu for storing URL of a data uploaded website in a bookmark, and the item 'Send message' is a menu for transmitting the URL of the data uploaded website to the mobile terminal via a message.

If a specific menu is selected from the picture shown in (b) or (c) of FIG. 12, an additional procedure may be executed. For instance, an exemplary case of selecting 'Add to bookmarks' is shown in FIG. 13.

Figure 13:
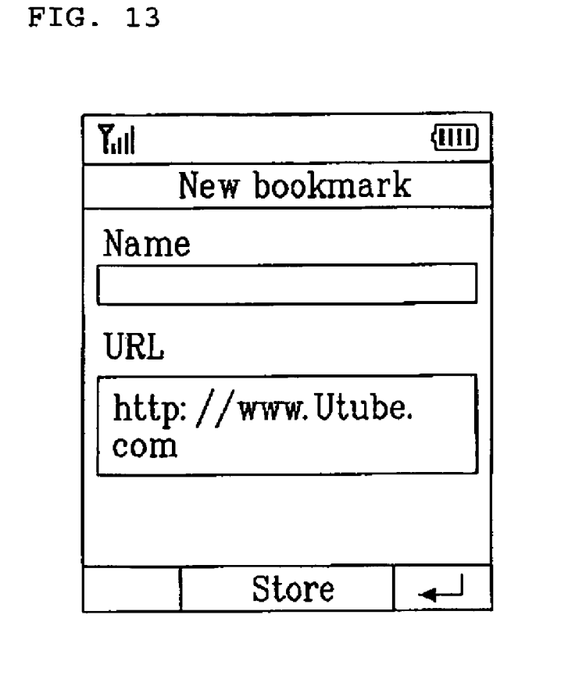

Referring to FIG. 13, if 'Add to bookmarks' is selected, a picture, to which URL of a specific website has been inputted, is displayed on a screen.

A user is then able to input a name of the inputted URL in addition.

The control unit 180 receives a storage command signal and then stores the URL and the name of the URL in the bookmark.

If a specific menu is selected from the picture shown in (b) or (c) of FIG. 12, an additional procedure may be executed. For instance, an exemplary case of selecting 'Go to browser' is shown in FIG. 14.

Figure 14:
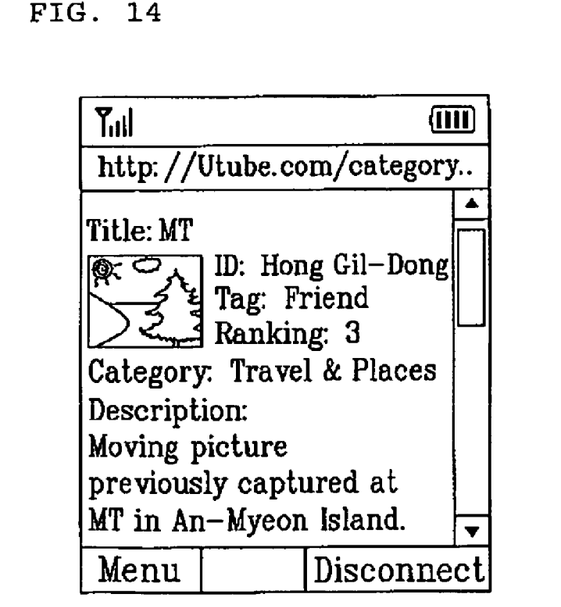

Referring to FIG. 14, a window on which URL information on a webpage for confirming uploaded data is displayed on an upper end of a screen and the uploaded data is displayed as a thumbnail image below the URL information. The thumbnail image may be a single image or a moving image.

Various kinds of upload information are displayed around the thumbnail. For instance, Title, ID, Tag, Category, Description, and the like are displayed. In particular, if the uploaded data is a moving picture, a play time and a file size can be displayed.

It will be apparent to those skilled in the art that various modifications and variations can be made in the present invention without departing from the spirit or scope of the inventions.

For instance, the above-described method according to one embodiment of the present invention can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal.

Thus, it is intended that the present invention covers the modifications and variations of this invention provided they come within the scope of the appended claims and their equivalents.

What is claimed is:

1. A mobile terminal, comprising:
   a camera configured to capture an image or video data;
   a memory configured to store the image or video data;
   a display configured to display the stored image or video data;
   an input unit configured to select an item of the stored image or video data to upload to a website, the input unit further configured to input upload information related to the selected data;
   a wireless communication unit; and
   a control unit configured to cause the wireless communications unit to access the website and to upload the selected item and the upload information to the website and, when the selected item and the upload information are completely uploaded, to automatically terminate access to the website,
   wherein the control unit is further configured to automatically store a URL of the website in a bookmark when the selected item and the upload information are completely uploaded.

2. The mobile terminal of claim 1, wherein the control unit is configured to cause the display to display a picture for accessing a specific webpage of the website to confirm the uploaded item.

3. The mobile terminal of claim 1, wherein the upload information includes URL information about the website.

4. The mobile terminal of claim 3, wherein the upload information further includes one of tag information, category information, a title, a user name, a ranking count, a description, a password, and an access level.

5. The mobile terminal of claim 1, wherein the control unit is further configured to cause the wireless communication unit to send a message to a predetermined address, the message containing URL information about where the uploaded item is uploaded.

6. The mobile terminal of claim 2, wherein the control unit is configured to cause the display to display a picture for accessing the specific webpage.

7. The mobile terminal of claim 1, wherein the control unit is further configured to
cause the display to display a picture for accessing a specific webpage of the website to confirm the uploaded item; and
cause a message to be sent from the mobile terminal or the website to a predetermined address, the message containing URL information about where the item is uploaded.

8. A mobile terminal, comprising:
a camera configured to capture an image or video data;
a memory configured to store the image or video data;
a display configured to display the stored image or video data;
an input unit configured to select an item of the stored image or video data to upload to a website and to input upload information related to the selected item;
a wireless communication unit; and
a control unit configured to cause the wireless communications unit to access the website, to upload the selected item and the upload information to the website, to cause the wireless communication unit or the website to automatically send a message to a predetermined address when the selected item and the upload information are completely uploaded, the message containing URL information about where the item is uploaded,
wherein the control unit is further configured to automatically store a URL of the website in a bookmark when the selected item and the upload information are completely uploaded.

9. The mobile terminal of claim 8, wherein the controller is configured to cause the wireless communications unit to automatically terminate access to the website when the selected item and the upload information are completely uploaded.

10. The mobile terminal of claim 8, the message comprises one of an e-mail, a MMS (multimedia message service) message, a SMS (short message service) message, and an IM (instant message).

11. The mobile terminal of claim 8, wherein the control unit is configured to cause the display to display a picture for accessing a specific webpage of the website.

12. The mobile terminal of claim 8, wherein the message includes a selected image.

13. The mobile terminal of claim 8, wherein the predetermined address is selected using phonebook information or contact information on the website or stored within the mobile terminal.

14. The mobile terminal of claim 8, wherein the control unit is further configured to cause the wireless communication unit to automatically terminate access to the website when the selected item and the upload information are completely uploaded.

15. A method of managing information on a mobile terminal, comprising:
capturing an image or video data in the mobile terminal;
storing the image or video data in a memory of the mobile terminal;
selecting an item of the stored data to upload to a website;
inputting upload information related to the selected item;
controllably accessing the website;
uploading the selected item and the upload information to the website;
automatically terminating access to the website when the selected item and the upload information are completely uploaded; and
automatically storing a URL of the website in a bookmark when the uploading is completed.

16. The method of claim 15, further comprising:
displaying a picture corresponding to a specific webpage of the website established to confirm the status of data uploads; and
accessing the website through the picture.

17. The method of claim 15, wherein the upload information includes URL information about the website.

18. The method of claim 17, wherein the upload information further includes one of tag information, category information, a title, a user name, a ranking count, a description, a password, and an access level.

19. The method of claim 15, further comprising:
sending a message to a predetermined address, the message containing URL information about where the data is uploaded.

20. The method of claim 16, further comprising:
displaying a picture for accessing the specific webpage.

21. The method of claim 15, further comprising:
displaying a picture corresponding to a specific webpage of the website established to confirm the uploaded data;
accessing the specific webpage via the picture; and
sending a message to a predetermined address, the message containing URL information about where the data is uploaded.

22. A method of managing information on a mobile terminal, comprising:
capturing image or video data in the mobile terminal;
storing the image or video data in a memory of the mobile terminal;
displaying the stored image or video data;
selecting an item of the stored image or video data;
inputting upload information related to the selected item;
accessing the website;
uploading the selected item and the upload information to the website;
automatically sending a message to a predetermined address when the upload is completed; and
automatically storing a URL of the website in a bookmark when the uploading is completed, the message containing URL information about where the selected item and the upload information are uploaded.

23. The method of claim 22, further comprising:
automatically terminating access to the website when the selected item and the upload information are completely uploaded.

24. The method of claim 22, wherein the message is one of an e-mail, a MMS (multimedia message service) message, a SMS (short message service) message, and an IM (instant message).

25. The method of claim 22, further comprising:
displaying a picture corresponding to a specific webpage of the website established to confirm uploads; and
accessing the specific webpage via the picture.

26. The method of claim 22, further comprising:
selecting an image; and
embedding the selected image into the message.

27. The method of claim 22, further comprising:
selecting the predetermined address from phonebook information or contact information on the website or stored within the mobile terminal.

* * * * *